(12) United States Patent
Rajendran et al.

(10) Patent No.: US 11,041,941 B2
(45) Date of Patent: Jun. 22, 2021

(54) METHOD AND DEVICE FOR CALIBRATING A RADAR OBJECT DETECTION SYSTEM

(71) Applicant: Steradian Semiconductors Private Limited, Bangalore (IN)

(72) Inventors: Gireesh Rajendran, Bangalore (IN); Apu Sivadas, Bangalore (IN)

(*) Notice: Subject to any disclaimer, the term of this patent is extended or adjusted under 35 U.S.C. 154(b) by 191 days.

(21) Appl. No.: 15/967,606

(22) Filed: May 1, 2018

(65) Prior Publication Data
US 2019/0265330 A1   Aug. 29, 2019

(51) Int. Cl.
| G01S 7/40 | (2006.01) |
| G01S 13/86 | (2006.01) |
| G01S 13/87 | (2006.01) |

(52) U.S. Cl.
CPC ......... *G01S 7/4026* (2013.01); *G01S 13/867* (2013.01); *G01S 13/87* (2013.01); *G01S 2007/403* (2013.01); *G01S 2007/4034* (2013.01)

(58) Field of Classification Search
None
See application file for complete search history.

(56) References Cited

U.S. PATENT DOCUMENTS

| 6,157,343 A | 12/2000 | Andersson | |
| 8,692,707 B2 | 4/2014 | Lee | |
| 8,718,334 B2* | 5/2014 | Whillock | G06K 9/00382 382/115 |
| 10,041,833 B1* | 8/2018 | Chirayath | G01J 3/108 |
| 2008/0199050 A1* | 8/2008 | Koitabashi | G06K 9/00805 382/107 |
| 2013/0335569 A1* | 12/2013 | Einecke | G06K 9/00805 348/148 |
| 2014/0035775 A1* | 2/2014 | Zeng | G01S 13/931 342/52 |
| 2015/0054673 A1* | 2/2015 | Baba | G01S 13/867 342/27 |
| 2016/0109566 A1* | 4/2016 | Liu | G01S 13/867 342/52 |
| 2016/0116573 A1* | 4/2016 | Appia | G01S 7/4026 342/52 |
| 2017/0285161 A1* | 10/2017 | Izzat | G01S 13/931 |
| 2018/0232947 A1* | 8/2018 | Nehmadi | G01S 17/931 |
| 2018/0267142 A1* | 9/2018 | Motoyama | G06T 7/74 |
| 2020/0158863 A1* | 5/2020 | Hohla | G01S 13/867 |

* cited by examiner

*Primary Examiner* — Marcus E Windrich

(57) ABSTRACT

An object detection system comprises a first object detection unit detecting an object from a first radio frequency (RF) signal data comprising first set of characteristics representing a first object, a second object detection unit detecting the object from an optical image data and a calibration unit calibrating the first RF signal data from the optical image data, in that, the second object detection unit and the first object detection unit are aligned to detect the object in a first region.

8 Claims, 8 Drawing Sheets

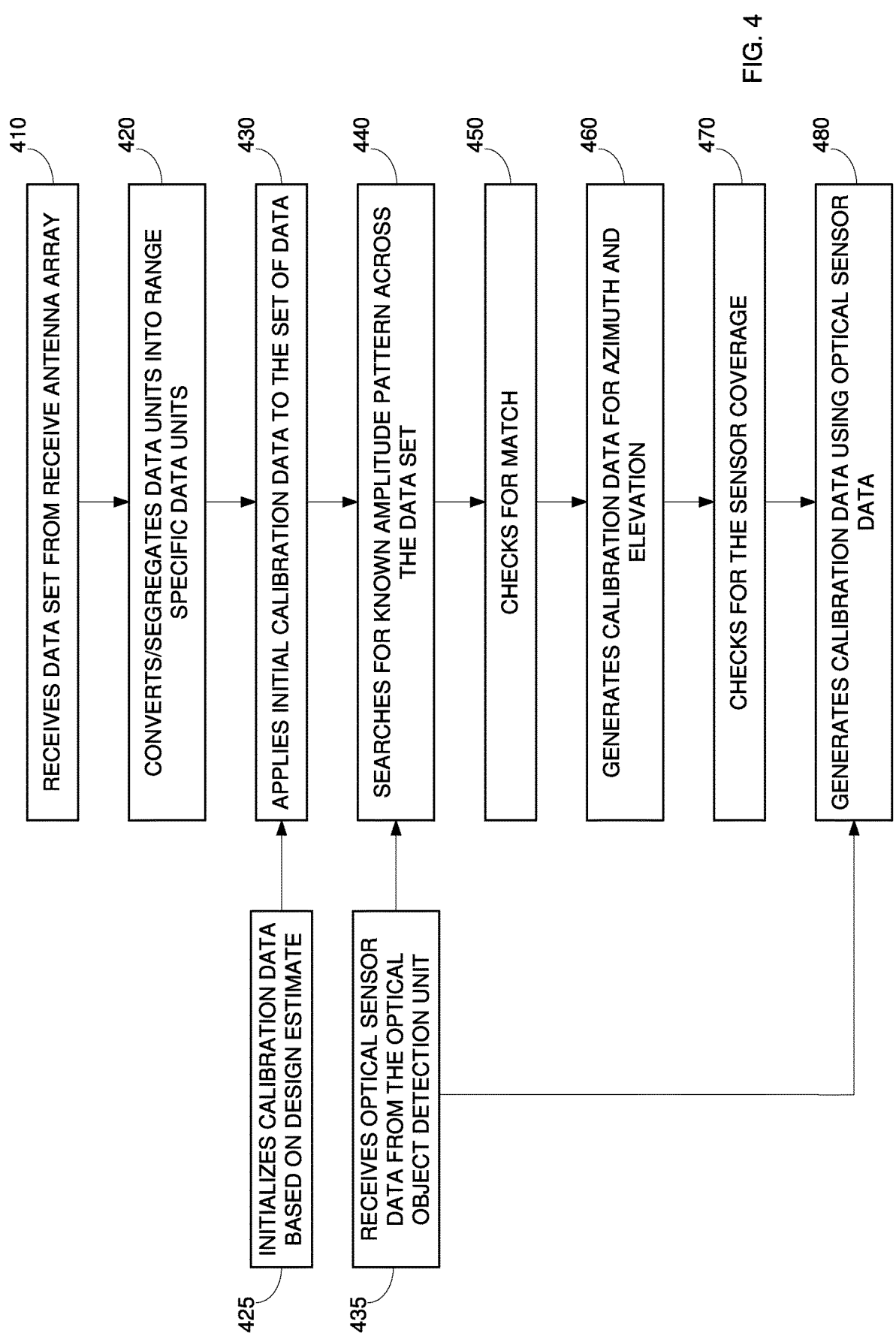

METHOD AND DEVICE FOR CALIBRATING A RADAR OBJECT DETECTION SYSTEM

CROSS REFERENCES TO RELATED APPLICATIONS

This application claims priority from Indian patent application No. 201841007250 filed on Feb. 26, 2018 which is incorporated herein in its entirety by reference.

BACKGROUND

Field of Invention

Embodiments of the present disclosure relate generally to an object detection system and more specifically to method and device for calibrating a radar object detection system.

Related Art

RADAR (RAdio Detection And Ranging) system(s) is often employed to detect an object, its shape, location and distance from a point of deployment. The radar is employed to detect one or more objects in order to navigate and avoid collision, for example, in unmanned vehicles, auto pilot applications, driver assistance systems, drones, unmanned aerial vehicles etc. As is well known in the art, a known radio frequency signal (RF signal) is transmitted in the direction of interest and reflected signal from the object is processed to determine the location, shape and distance of the object. In that, amplitude pattern, phase pattern and other parameters of the reflected signals are measured to determine the object, shape and distance. Often array of antennas are employed to transmit the RF signal and to receive the RF signal. Each antenna in the array channels an RF signal for transmission or channels reflected signal. The Radar system needs to be calibrated for accurate detection of the object and enhance the resolution of the object detection.

In one conventional calibration technique disclosed in U.S. Pat. No. 6,157,343, a calibration signal is sent to each RF channel with a pre-calculated or known phase. The received signals are used to determine any delay or phase mismatch between RF channels. The estimated error is used as calibration error for compensation. This calibration technique employs expensive hardware for calibration due to the additional switches and cannot correct for any antenna radiation patterns related phase error. Further, this technique cannot calibrate and correct error in calibration signal.

In another conventional calibration technique disclosed in the U.S. Pat. No. 8,692,707, a calibration signal is simultaneously coupled to each RF channel with a pre-calculated or known phase. The received signals are used to determine any delay or phase mismatch between RF channels. The estimated error is used as calibration error for compensation. However, this technique cannot correct for any antenna radiation patterns related phase error. Further, when the spacing between antenna elements are high enough to introduce 180 to 130 degree phase change in the BIST line signal from channel to channel, any error in BIST signal phase estimate between RF channels cannot be corrected.

SUMMARY

According to an aspect of the present disclosure, an object detection system comprises a first object detection unit detecting an object from a first radio frequency (RF) signal data comprising first set of characteristics representing a first object, a second object detection unit detecting the object from an optical image data and a calibration unit calibrating the first RF signal data from the optical image data, in that, the second object detection unit and the first object detection unit are aligned to detect the object in a first region.

According to another aspect, the object detection system further comprises an antenna array for transmitting a second RF signal over the first region and an antenna array for receiving a reflected RF signal that is reflection of the second RF signal from the first object present in the first region and an optical sensor capturing a first image frame of the first region, in that, the first RF signal data is formed from the reflected RF signal.

According to yet another aspect of the present disclosure, the object detection system further comprises a radar signature generator for generating a radar RF signal, a set of processing units for transforming the radar RF signal to the second RF signal and a second set of processing units transforming the reflected RF signal to the first RF signal data, in that, the calibration unit calibrating the error in at least one of the first set of processing units and the second set of processing units.

According to yet another aspect the object detection system stores a reference object data comprising a second amplitude pattern and a second phase pattern corresponding to a second object, in that the calibration unit compares first amplitude pattern with the second amplitude pattern to calibrate first pattern from the second phase pattern.

According to another aspect of the present disclosure, a method for calibrating a MIMO radar object detection system is provided and comprises receiving data set having plurality of data units from a receive antenna array in the MIMO, segregating the plurality of data units into range specific first data units and second data units, searching for a known amplitude pattern across the data set, receiving optical sensor data from an optical object detection unit; and generating calibration data using optical sensor data.

Several aspects are described below, with reference to diagrams. It should be understood that numerous specific details, relationships, and methods are set forth to provide a full understanding of the present disclosure. One who skilled in the relevant art, however, will readily recognize that the present disclosure can be practiced without one or more of the specific details, or with other methods, etc. In other instances, well-known structures or operations are not shown in detail to avoid obscuring the features of the present disclosure.

BRIEF DESCRIPTION OF DRAWINGS

FIG. 3D is an example array of phase angles corresponding received reflected signal from.

FIG. 4 is a block diagram illustrating a manner in which radar object detection system may be calibrated in an embodiment.

DETAILED DESCRIPTION OF THE PREFERRED EXAMPLES

Figure 1:
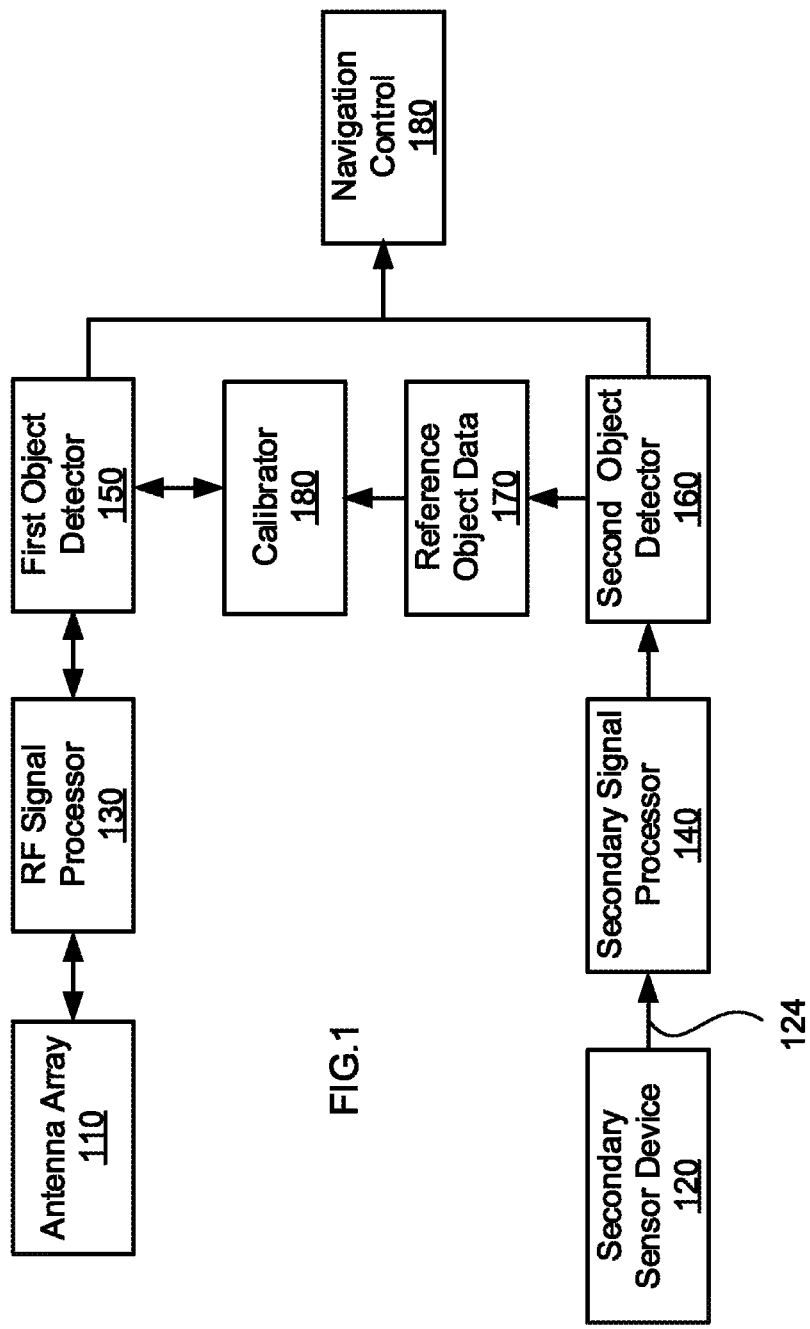
FIG. 1 is a block diagram of a system for object detection in an embodiment.

FIG. 1 is a block diagram of a system for object detection in an embodiment. The system is shown comprising antenna array 110, secondary sensor device 120, RF signal processor 130, secondary signal processor 140, first object detector 150, second object detector 160, secondary object reference 170, calibrator 180 and navigation control 190. Each block is described in further detail below.

Antenna array 110 transmits an RF signal beam and receives a signal reflected from an object. The antenna array may be arranged in two dimensional patterns and may comprise both transmitting antenna and receiving antenna. Each antenna element in the antenna array is fed with a signal having different phase shift to cause a Radio Frequency (RF) beam in the desired direction. The phase shift is dynamically changed to steer the beam to cover two dimensional areas. Thus, the RF signal reflected from any object within the coverage area is received and further processed. The reflected RF signal received on the antenna array 110 is provided to RF signal processor 130.

Secondary sensor device 120, positioned in the direction that is complementary (or aligned) to the coverage area of the RF beam formed by the antenna array 110, captures object information like images or sequence of image frames (movie), thermal images etc. The secondary sensor device 120 may comprise plurality of high resolution cameras, infrared, thermal image capturing devices, optical sensors positioned definitively in multiple directions with respect to the reference on which the object detection system 101 is mounted. Accordingly, images thus captured maintain references with respect to the object detection system. The image captured on the image capturing device is provided to the image processor on path 124.

RF signal processor 130 processes the RF signal for transmission and the reflected RF signal for object detection. For example, the RF signal processor may perform, amplification, sampling, analog to digital conversion, digital to analog conversion, phase shift operations, channeling RF signal to plurality of antenna elements in the antenna array, load balancing, determining pattern of the signal received from the plurality of receiving antenna elements (receiving the reflected signal, for example).

The secondary signal processor 140, processes the sequence of secondary sensor signal comprising the object information. An example secondary signal may comprise images (frames) and Lidar signals for example. The secondary signal processor may perform operations like image enhancement, decompression, compression, noise reduction, buffering, contour recognition, image referencing, for example. The processed image and/or Lidar (Light Detection and Ranging) images is provided for object detection.

First object detector 150 detects object from the RF signal received on the antenna array. The first object detector may compare the transmitted RF signal and the received RF signal to detect and identify shape of an object. For example, the first object detector may determine the shape, location and distance of one or more objects within the area of coverage of the antenna array.

Second object detector 160, detects the object from the sequence of image frames received from the image capturing device. The second object may determine the object shape and position either two dimensional (2D) or three dimensional (3D). The second object detector may employ technique such as contour detection techniques, edge detection techniques, cluster detection technique, for example and any other known image processing techniques for detecting objects in the frames.

The reference object data 170 stores sets of expected RF signal values/pattern for a known object of known shape. The expected reflection of RF signal values in terms of amplitude, phase, etc., may be stored in a memory. The stored measurements representing a known object maybe a single valued, one dimensional array, two dimensional array or three dimensional array (or in matrix form).

Calibrator 180 calibrates the object detection system for accurate detection of object shape and position. The calibrator receives the reference object parameters from the reference object data 170, object is detected by the second object detector, and compares the received RF signal parameter when the reference object is being detected. The calibrator 180 calibrates the object detection system 101, by making difference between the reference object parameters and the received RF signal parameters to substantially zero. Navigation control 190 receives the information of the detected object and generates various navigational control signals.

In one embodiment, the calibration unit 180 is triggered when a pre-determined objects is detected within the coverage area (field of vision and range of both radar and a secondary vision system like optical). Once the calibration unit determine the calibration values (calibration data), the same is used improve the accuracy of the object detection system 101 for all objects and scenarios within and beyond the range of the secondary vision system. The manner in which calibration unit 180 may calibrate object detection system 101 is further described with reference to a Multiple-Input and Multiple-Output (MIMO) sensor based radar system, for example.

Figure 2:
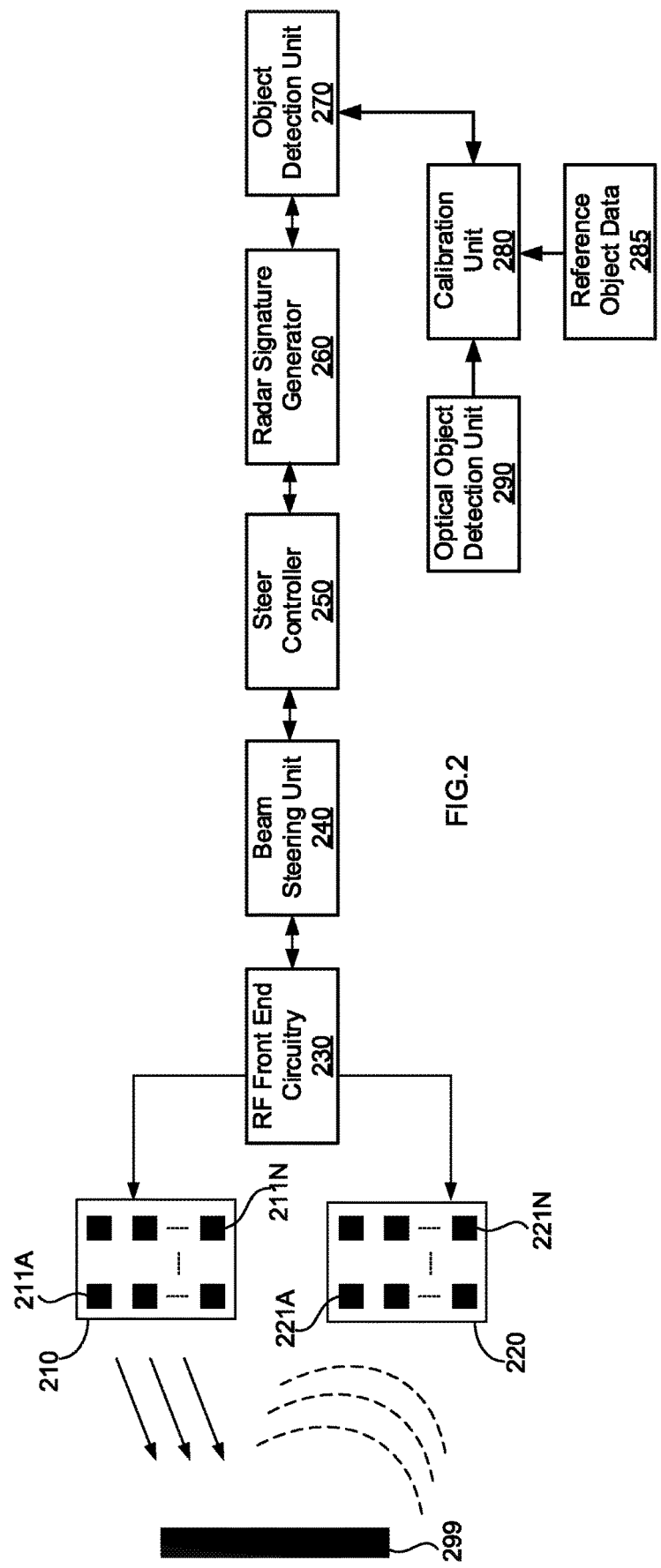
FIG. 2 is an example multiple input and multiple output (MIMO) radar system for detecting the object in an embodiment.

FIG. 2 is an example multiple input and multiple output (MIMO) radar system for detecting the object 299 in an embodiment. The MIMO radar system is shown comprising transmit antenna array 210, receive antenna array 220, RF front end circuitry 230, beam steering unit 240, steer controller 250, radar signature generator 260, 3D object detection unit 270, calibration unit 280, reference object data 285, and optical object detection unit 290. Each block is described in further detail below.

The optical object detection unit 290 detects the object 299 using optical sensors. In one embodiment, the optical object detection unit 290 represents the example combined operation of units 120, 140 and 160. The optical object detection unit 290 may employ optical sensors to detect the object in terms of shape and location and provides shape and position reference. In one embodiment the optical sensors are positioned complimentary and in alignment with the antenna array 210 and 220 such that the object position and shape captured by the optical sensors are in synchronous and aligned with the objects detected by the objected detection unit 270. The object detected by the optical object detection unit 290 is provided on path 298.

The radar signature generator 260 generates a unique signal pattern for transmission over the antenna array 210. The unique signal pattern referred to as radar signature may comprise a pseudo random sequence with a good auto correlation property.

The RF front end circuitry 230 performs RF signal conditioning for transmission of radar signature and receiving the corresponding reflection signal from the object 299. The RF front end circuitry 230 comprises RF amplifier, Band pass filter, impedance matching elements, for example. In that, the RF front circuitry may amplify the RF radar signature to a desired power level for transmission and on the other hand, the RF front end circuitry 230 may boost the received RF signal to a level required for further processing and detecting.

The transmit antenna array 210 transmits and receives antenna array 220 together from MIMO antenna (Radar sensors) unit capable of transmitting and receiving corresponding number of coordinated RF radar signature signals. The transmit antenna array 210 may comprise linear array, two dimensional array of antenna elements 211A-211N etched in on a substrate. Distance between each antenna elements may be adjusted to a value in relation to the frequency of the signal transmitted. For example the distance between the two elements may be set to λ/2 (where λ is the wave length of the RF signal being transmitted on the antenna array 210).

The beam steering unit 240 generates N number of RF signals that are phase shifted versions of the RF radar signature signal. The N number of RF signal is provided to N transmit antenna elements for transmission. Changing the phase φ between each RF signal transmitted from the antenna element, the beam formed by the antenna array 210 is steered to an angle θ as is well known in the art. The angle of the beam θ in relation to the plane of antenna array is varied by changing the relative phase angle φ between the antenna element 211A-N. The steer controller 250 provides a control signal for changing the relative phase angle φ between the N numbers of RF signal to direct the beam to a desired direction. The beam directed to an angle θ covers a patch of area in two dimensions (cylindrical or spherical coordinate) at each time instance and accordingly scanning the area of interest for objects. With respect to the received signal (signal received on N antenna elements) the beam steering unit 240 may correspondingly add the phase to combine the N received signals.

Figure 3A:
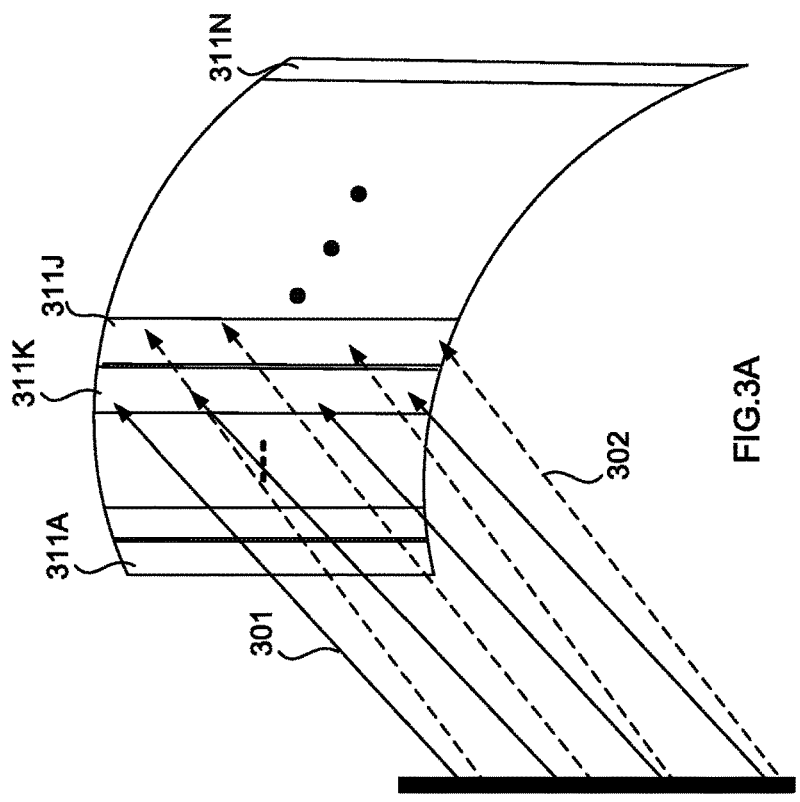
FIG. 3A illustrates an example beam scanning a two dimensional area in a spherical coordinate.

FIG. 3A illustrates an example beam scanning a two dimensional area in a spherical coordinate. The figure shows beam 301, area 310, area segments 311A-311N, and focused area segment 310K. As shown there, beam 301 is focused to area segment 311K at an angle ($\theta_k$) when the relative phase angle between the antenna array elements 211A-N is set to $\phi_k$.

The beam 302 represents the actual beam focused to area 311J at an angle ($\theta_k+\Delta$) when the steering controller 250 sets relative phase angle between the antenna array elements 211A-N is set to ($\phi_k$). The error in the phase angle reaching the antenna array 211A-N is due to delay caused by the elements of the RF front end circuitry 230, beam steering unit 240 and the spacing between the antenna elements 211A-N, for example.

Figure 3B:
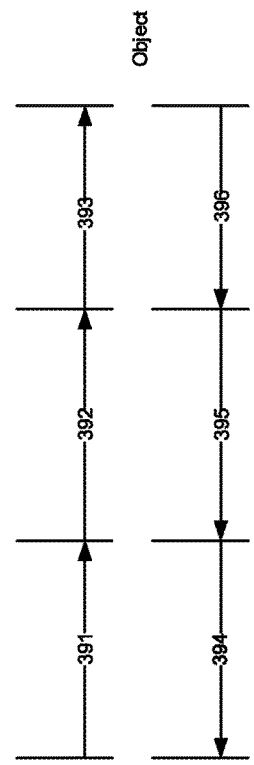
FIG. 3B illustrates the manner in phase angle $\phi_k$ set by the beam steering unit manifest to $\phi_k+\delta$ at the transmit antenna array resulting in actual beam angle ($\theta_k+\Delta$).

FIG. 3B illustrates the manner in phase angle $\phi_k$ set by the beam steering unit 240 manifest to $\phi_k+\delta$ at the transmit antenna array 210 resulting in actual beam angle ($\theta_k+\delta$). As shown there, the error 391 represents error in the beam steering unit 240. For example, the beam steering unit comprises plurality of phase shifter providing desired phase shift. The error in each phase shifter (accuracy of phase shift) may cause the output of beam steering unit 240 to generate a phase shift that is offset by a $\delta1$.

The error 392 represents delay caused in the RF front end circuitry 230. For example, the RF front end circuitry may cause path delay and component delay to the signal presented at its input. For example, the RF filter, the RF power amplifier and other RF processing elements may cause a delay or phase lag/lead to the signal thereby presenting an RF signal that is further offset by a value $\delta2$.

The error 393 represents delay caused in the antenna array 210. For example, each antenna element may be physically located in a pattern and the path connecting each antenna may cause different delay phase lag/lead to the signal thereby presenting an RF signal that is further offset by a value $\delta3$. Accordingly, the sum of the phase errors 391-393 ($\delta$) in phase at the transmit antenna array may be represented as $\delta1+\delta2+\delta3$, for example.

The object 299 reflects the RF beam incident on it by the transmit antenna array 211A-N. The reflected RF signal exhibits unique characteristics that enable determination of object shape, size and position. Often the characteristics include amplitude pattern, phase pattern, and Doppler, for example.

Continuing further with respect to FIG. 2, the manner in which the reflected signal is received at the receiving antenna is further described below.

Figure 3C:
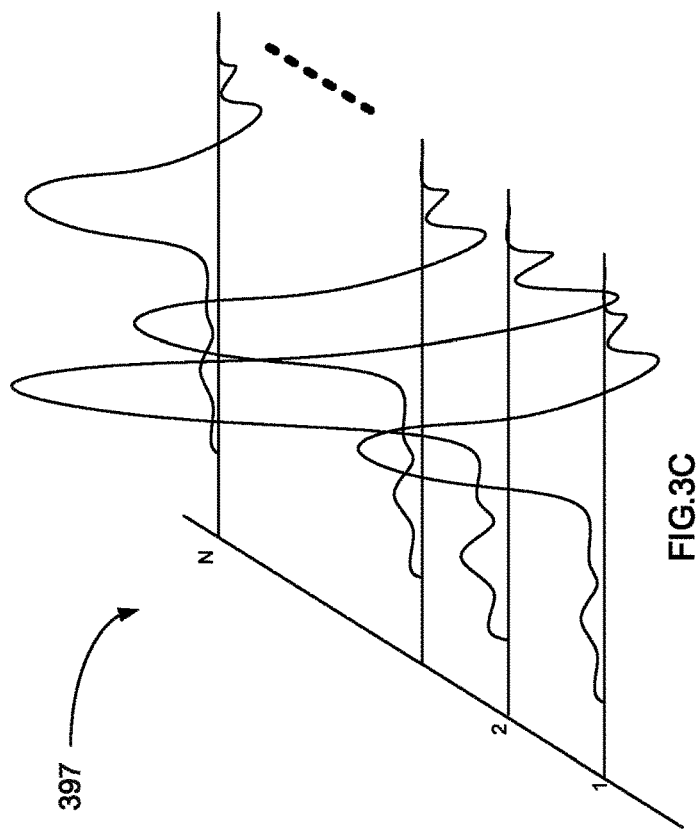
FIG. 3C is a set of graph illustrating an example amplitude pattern of signal reflected from object received on N receive antenna elements.
Figure 3D:
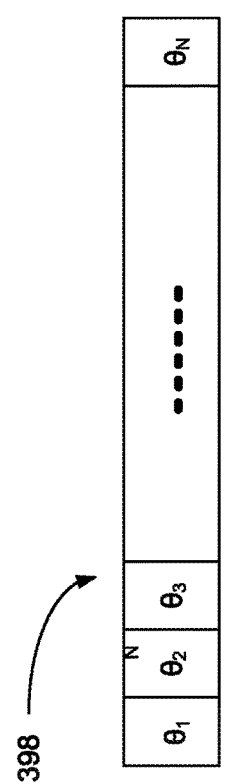

The receive antenna array 220 may comprise receive antenna elements 221A-220N that are conveniently formed on substrate with a spacing between each element set similar to that of transmit antenna array 210. Though, transmit antenna array and receive antenna array are depicted independently for convenience of understanding, the two set of transmit and receive antenna elements 211A-N and 221A-N may be disposed on a single substrate intermediate to one another and/or duplexed in time, for example. FIG. 3C is a set of graph illustrating an example amplitude pattern 397 of signal reflected from object 299 received on N receive antenna elements 221A-N. The beam steering unit 240 may determine the effective phase angle between the received antenna elements to determine phase pattern of the reflected signal. FIG. 3D is an example array of phase angles 398 corresponding received reflected signal from 299. The phase angle pattern 398 and amplitude pattern 397 represent the shape and size of the object 299.

Similar to the error caused in the transmit path, the phase angles registered at the beam steering unit 240 may also comprise errors caused due to the signal delay caused in the return path comprising antenna element 220, RF front end circuitry 230, and beam steering unit 240. In FIG. 3B, the errors 394, 395 and 396 (with respective values depicted as $\delta4$, $\delta5$ and $\delta6$) represents delay or phase lag/lead caused on the reverse path respectively by the antenna array 220, RF front end circuitry 230 and beam steering unit 240. These errors in the system cause detection of the object in terms of at least one of shape, distance and size to be erroneous. Further, the error if uncorrected may limit the resolution of the object detection. For example, the resolution may be limited to the total error 391-396.

The reference object data 285 stores information of predetermined or well-known objects. The information of each well-known object may comprise amplitude pattern and phase pattern of the reflected signal corresponding to the well-known object. In one embodiment, the reference object data comprises, expected amplitude and phase pattern of the reflected RF signal from the object 299 received on N receive element 221A-N. The expected amplitude and phase pattern may be mathematically computed or obtained from the optical object detection unit 290. Further, the reference object data may comprise the object shape information.

The calibration unit 280 calibrates and corrects the errors 391-396 to enhance the accuracy and resolution of the detected object in terms of shape and location. In one embodiment, calibration unit 280 calibrates/measures the errors 391-396 by comparing the object information received from the optical object detection system 285 and the corresponding object information in the reference object information data 270. In one embodiment, the calibration units 280 measures the errors 391-396 for each antenna element and add/subtract the values to/from the phase pattern 398. The measured error is adjusted or corrected for accurate detection of the object. The calibration unit 280 may be operative in a calibration mode for calibration and once the correction values or the value of errors 391-396 are determined, the calibration unit may be turned off by applying the corrections determined in the calibration mode to amplitude and phase patterns 397 and 398.

The object detection unit 270 detects the objects from the reflected signal received on the antenna array 221A-N, the signal transmitted on the antenna array 211A-N and the values received from the calibration unit 280. In one embodiment, the object detection unit receives amplitude and phase pattern 397 and 398 for determining the object. The object detection unit 290 may measure time, angle of arrival, and other parameters with respect to the transmitted signal to determine amplitude and phase pattern and the calibration values may be added/subtracted from each antenna measurement for determining the object shape and position. The manner in which the calibration unit 280 determines the error and performs correction in an embodiment is further described below.

Figure 5A:
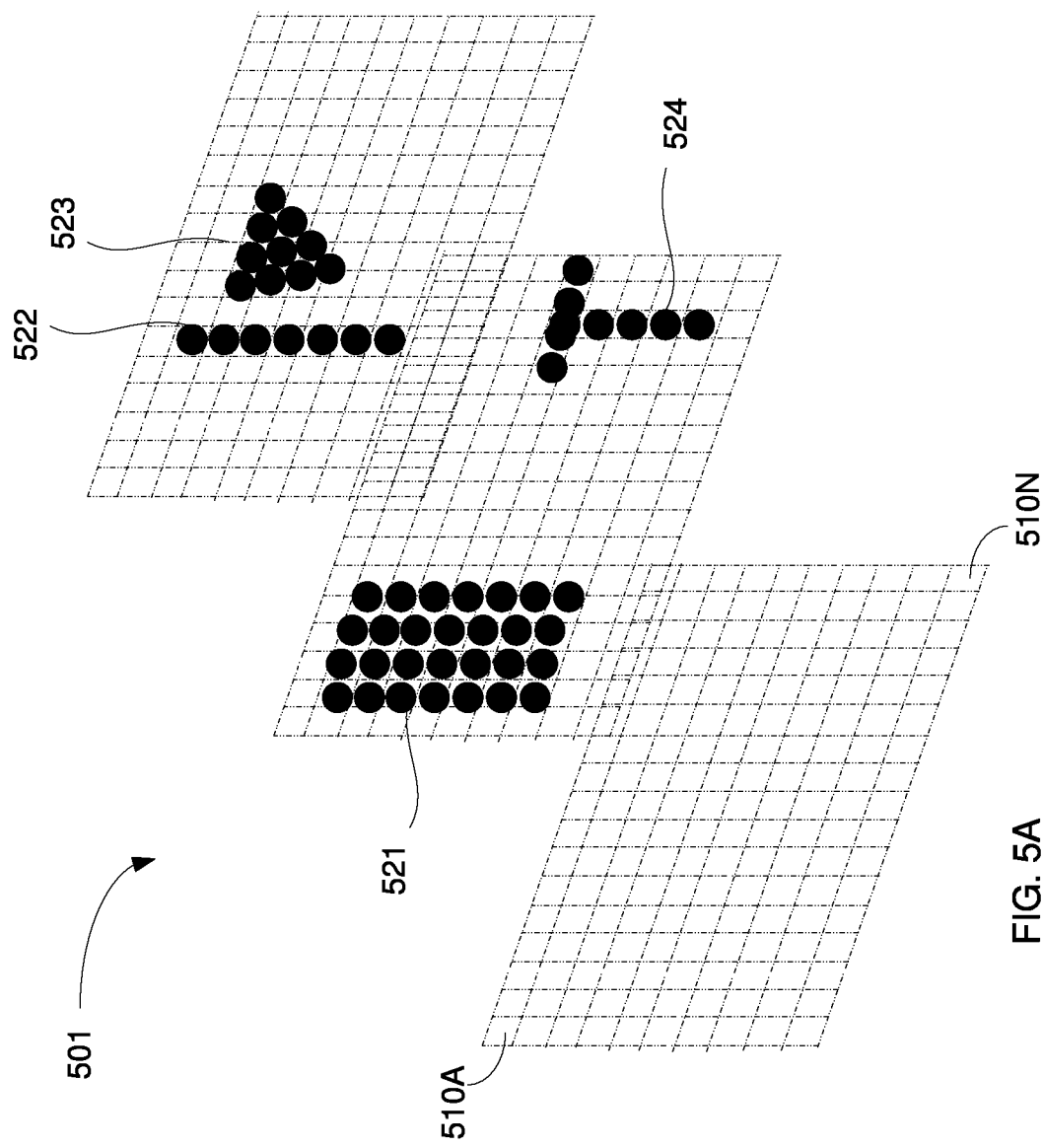
FIG. 5A illustrates an example data set received over the radar coverage area.

FIG. 4 is a block diagram illustrating a manner in which radar object detection system may be calibrated in an embodiment. In block 410, the calibration unit 280, receives data set from receive antenna array 220. The data set may comprise the amplitude pattern, phase pattern and range received on the receive antenna for the entire radar coverage area in one scan period. The amplitude pattern and phase pattern may be in digital form for digital processing. FIG. 5A illustrates an example data set 501 received over the radar coverage area in one scan period. Shown there is the data set 501 comprising data unit 510A-510N and objects 521, 522, 523, and 524. In that each data unit 510A-510N may comprise plurality of amplitude pattern, phase pattern and range (also often referred to as radar scattering data) received on the antenna elements 221A-221N, for example.

In block 420, the calibration unit 280 converts/segregates data units into range specific data units. For example, each data unit comprises distance information in the form of range and the calibration unit may tag data units having substantially same range. For illustration, the data units forming objects 522 and 523 are considered having one range and the data units forming the objects 521 and 524 are having second range. Further, the objects 551 and 552 are well-known data in the reference database 285.

In block 425, the calibration unit 280 initializes calibration data based on design estimate. The initial calibration data correction may be determined based on the various design parameters considered during the design of the radar object detection system. For example, the physical parameters, components in the transmit path and receive path, amplifiers delay, filters delay etc., may be used to determine overall delay in the transmit path and receive path to arrive at the initial calibration data.

In block 430, the calibration unit 280 applies initial calibration data to the set of data. For example, the calibration determined based on the design parameter is applied (added/subtracted) to amplitude and phase patterns in each data unit 510A-510N.

Figure 5B:
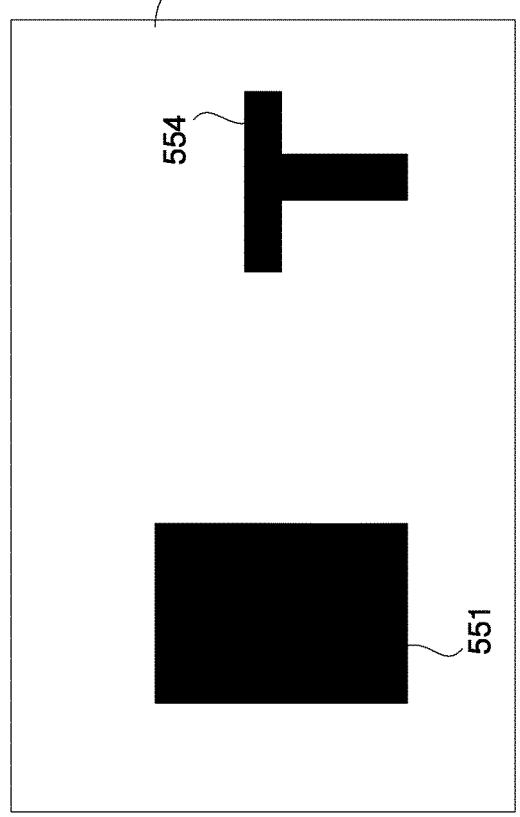
FIG. 5B is an example optical sensor data.

In block 435, the calibration unit 280 receives optical sensor data from the optical object detection unit. The optical sensor data may comprise images, pictures, sequence of image frames collected on one or more cameras positioned to collect pictures from the data coverage area providing data set 501. The optical image sensor data may be processed image, identifying objects in the frame. FIG. 5B is an example optical sensor data capturing the images from the radar coverage area synchronized in time. For illustration, the optical sensor data 550 is shown comprising captured objects 551 and 554 while range of the objects 552 and 553 is beyond the visible range (or beyond range of optical sensor).

In block 440, the calibration unit 280 searches for known amplitude pattern (magnitude pattern) across the data set. The calibration unit 280 compares the amplitude patterns in the data set 501, namely the amplitude patterns of segregated data units forming the object 551-554 with the amplitude pattern of well-known objects in the reference object data 285. Technique of correlating amplitude pattern of well-known object with the data set 501 may be employed for searching. Alternatively, any pattern recognition techniques may be employed.

In block 450, the calibration unit 280 checks for match. A match is determined to be found if comparison result exhibits a similarity above a threshold. For example, if the correlation value is above a threshold value, the calibration unit considers match is found and the corresponding well-known object is tagged for further processing. If match is found, control passes to block 460. For illustration, as an example of finding a match, the calibration unit determines object 552 matches with one well-known object in the reference database 285. If match is not found, control passes to block 470.

In block 460, the calibration unit 280 generates calibration data for azimuth and elevation. The calibration data may be generated from the reference phase pattern of the well-known object that matches with the object 552. For example, the difference between the reference phase pattern and the phase pattern of object 552 in the data set 501 forms the calibration data. In one embodiment, the phase pattern comprises phase angle measured on the N RF signals received on N antenna elements 221A-N. Accordingly, the calibration data is applied to the N RF signals received on the corresponding antenna elements thereby, at least reducing the effect of error 391-396 in determining the object shape, size and location effectively. The calibration data may be stored for subsequent use for correction or the initial data set may be updated with the new calibration data generated from the comparison with well-known data.

In block 470, the calibration unit 280 checks for the sensor coverage. In that, the calibration unit checks if the dataset 501 comprises data from entire coverage area of the sensors (transmit antenna array 210 and the steering controller 240). In one embodiment, the calibration unit 280 checks if the received data set 501 is aligned with the optical data received in block 435. If the coverage is determined to complete and aligned, the control passes to block 480, else to block 410 for receiving new set of data.

In block 480, the calibration unit 280 generates calibration data using optical sensor data. In that, the calibration unit uses the optical sensor data corresponding to object 551 for generating the calibration data. In the first step, the calibration unit may determine the azimuth angle from the phase angle pattern stored in the data base. In second step, the calibration unit 280 may determine the elevation angle from the optical sensor alignment information and generate the overall calibration data. The calibration data is then stored, applied or updated with the initial calibration data for subsequent corrections. In one embodiment, the calibration unit 280 may perform both operations in block 480 and 460 to provide one of or average of calibration data generated in the respective blocks.

In one embodiment, the calibration unit search for known magnitude pattern across sensors across each range bins. At first the calibration unit 280 checks if the magnitude/amplitude of samples per bin is greater than a threshold value (represented by relation $|S_{mp}(R_n)|>S_{threshold}$) for m=1 through M and p=1 through P.

Once amplitude condition matches the threshold relation in a given range bin (for example range bin $R_k$), then the calibration unit 280 checks if the ratio of the amplitude $|S_{mp}(R_n)|$ with any known object in the range $R_k$ ($|S_{mp}(R_k)|/|S_{knownObject\_mp}(R_k)|$) is within a range of value. For example, the calibration unit may check if the ratio is in the range of (1+Error) and (1−Error) ([(1−Error)<($S_{mp}(R_k)$|/|$S_{knownObject\_mp}(R_k)$|)<(1+Error)], in that Error represents the initial calibration value.

In one embodiment, the calibration unit 280 determine a random phase error and a systematic phase error. For example, when the calibration unit 280 determines that a known object is present in the field of view (FoV)/coverage area range $R_k$ and optical object detection unit 290 confirms the presence of known object, the random phase error of a sensor $S_{mp}$ is computed by relation:
$Q_{random\_mp}$=Phase[$S_{mp}(R_k)$]−Phase[$S_{knownObject-mp}(R_k)$] in that $Q_{random\_mp}$ representing random phase error of the sensor element $S_{mp}$, Phase[$S_{mp}(R_k)$] representing measured phase of the sensor element $S_{mp}$, and Phase[$S_{knownObject\_mp}(R_k)$] representing the phase angle reported by the optical detection unit 290.

Figure 7B:
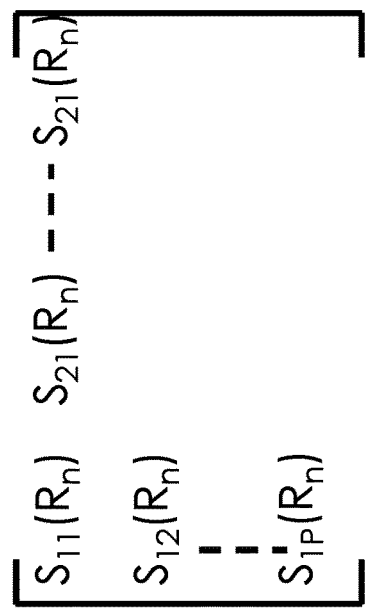
FIG. 7B is an example matrix representing the sensor data for range 1-N.
Figure 7C:
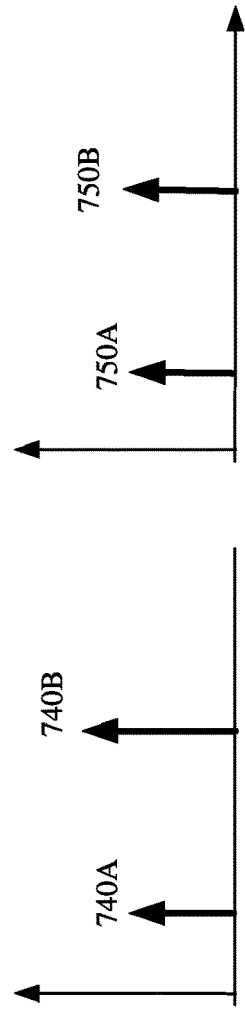
FIG. 7C illustrates an example segregated range specific samples.
Figure 6:
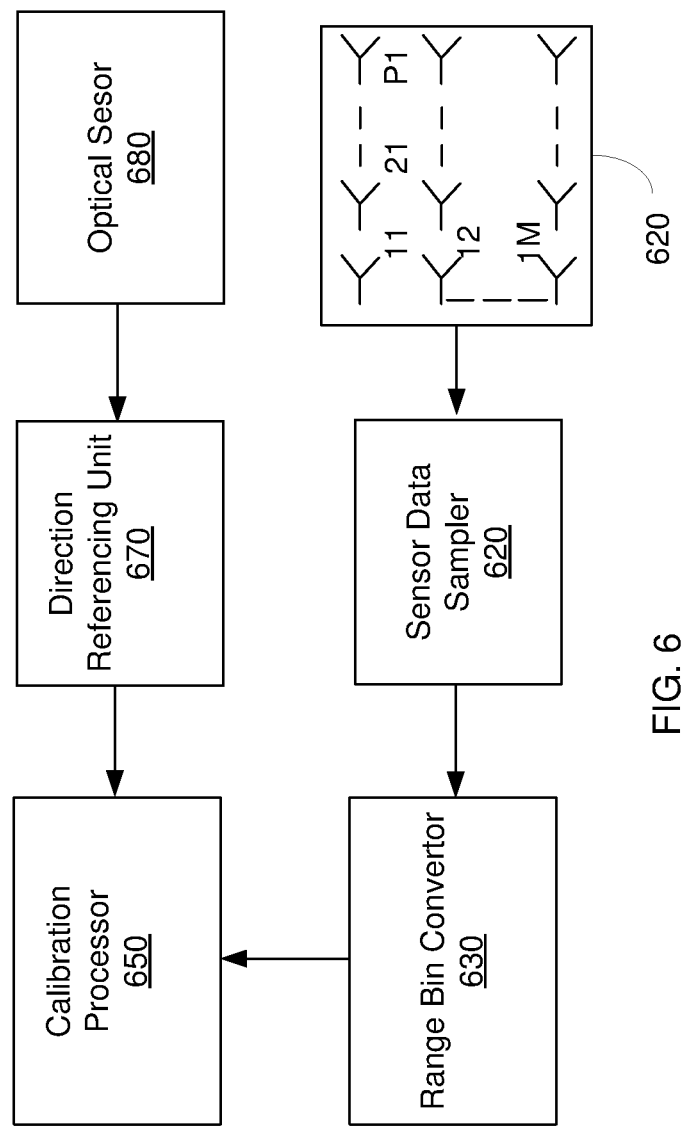
FIG. 6 is block diagram illustrating the manner in which calibration unit may be deployed to utilize single shared processor in an embodiment.
Figure 7D:
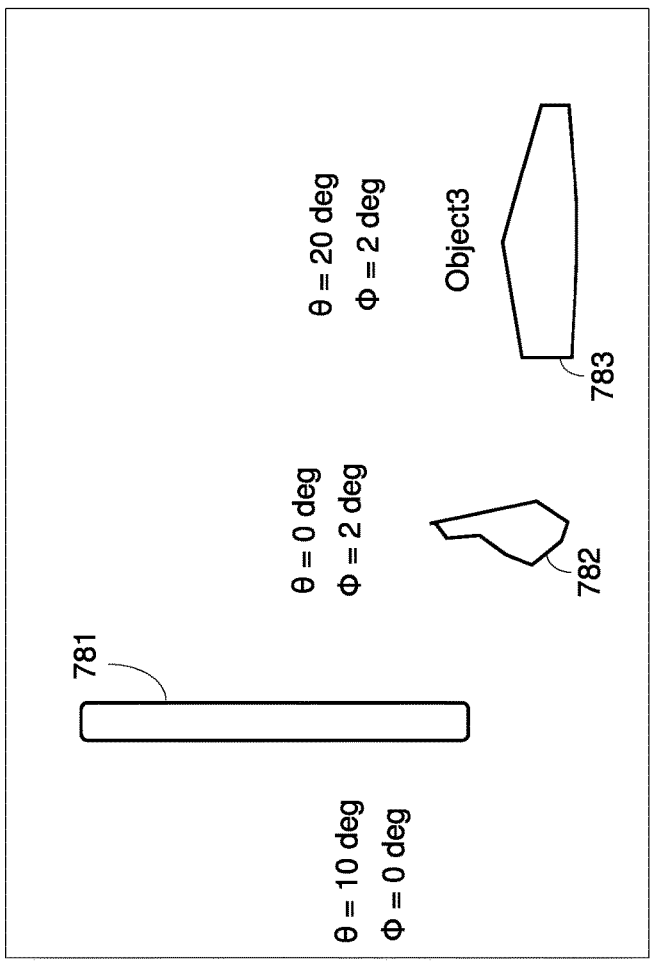
FIG. 7D illustrates an example direction referenced object data.
Figure 7A:
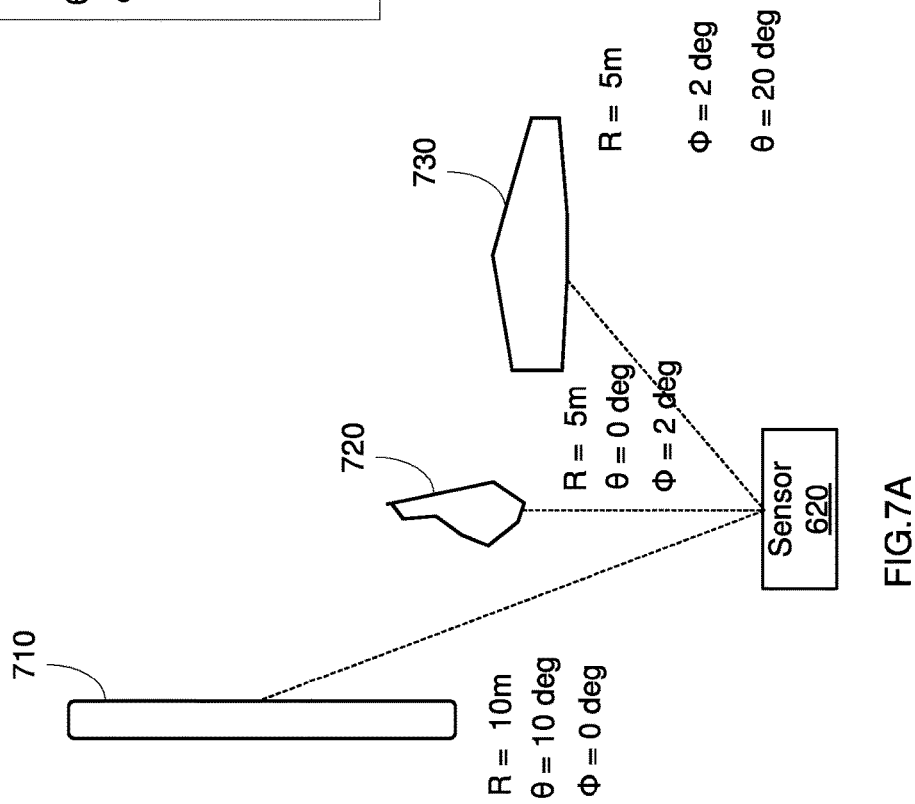
FIG. 7A illustrates an example coverage area.

In one embodiment, the calibration unit determine the systematic error for sensor $S_{mp}$ for an object at azimuth=q and elevation=F by relation: $Q_{tilt\_mp}=2*(\pi/\lambda)*[d_{x\_mp}*\sin(q)+d_{y\_mp}*\sin(F)]$, in that $d_{x\_mp}$ & $d_{y\_mp}$ are the displacement of sensor $S_{mp}$ in x and y direction with respect to reference sensor. A final phase correction factor for sensor $S_{mp}$ after calibration is determined as: $Q_{Final}=Q_{random\_mp}+Q_{tilt\_mp}$ FIG. 6 is block diagram illustrating the manner in which calibration unit 280 may be deployed to utilize single shared processor in an embodiment. Shown there is the receive antenna array 620 forming a radar sensor array comprising two dimensional M×P antenna elements arranged in M rows and P columns. Each sensor element therefore may be represented as $S_{mp}$ where m and p taking value from 1 tp M and 1 to P respectively. The receive antenna array 620 capture scatters from a coverage area. FIG. 7A illustrates an example coverage area. As shown there the coverage area comprise object 710, 720 and 730. The object 710 is shown at a range (R) 10 meters, azimuth Θ at 10 Degrees and elevation φ at zero degrees. Similarly, the object 720 is shown at a range (R) 5 meters, azimuth Θ at zero Degrees and elevation φ at 2 degrees, and object 730 is shown at a range (R) 5 meters, azimuth Θ at 20 Degrees and elevation D at 2 Degrees.

The sensor data sampler 620 samples signal received on each sensor element $S_{mp}$ at a sampling rate $f_s$ (where sampling rate is greater than the Nyquist rate). The samples may be represented as $S_{mp}(n/fs)$. In that n taking a value from 1 to N. The samples $S_{mp}(n/fs)$ is provided to the range bin converter 630.

The range bin convertor 630 segregates the samples $S_{mp}(n/fs)$ into Rn number of range bins. The samples in each range bins may be represented as $S_{mp}(Rn)$. In that, n representing the $n^{th}$ range bin and takes value from 1 through N. FIG. 7B is an example matrix representing the sensor data for range 1-N.

In one embodiment, the range bin convertor 630 employ FFT (fast Fourier transform) and windowing technique to segregate the range bins for frequency modulated continuous wave radar (FMCW). The range bins $S_{mp}(Rn)$ is provided to shared processor. FIG. 7C illustrates an example segregated range specific samples. As shown there sample sets 740A, 740B corresponds to the range bin 5M while the 750A, and 750B corresponds to range bin 10M. Each sample set 740A, 740B, 740A, 750B are the samples from the antenna elements m1p1, m2p1 so on.

The optical sensor 680 provides the optical sensor data to direction referencing unit 670. The direction referencing unit 670 references the optical image data into 2D referenced data with image (or object in the image) referenced to azimuth and elevation angle Θ and φ respectively. FIG. 7D illustrates an example direction referenced object data, as shown the object 781 is referenced at Θ=0 Degrees and φ=0 Degrees, the object 782 is referenced at Θ=0 Degrees and φ=2 Degrees and the object 783 is referenced at Θ=20 Degrees and φ=2 Degrees. The range information is not captured.

The calibration processor 650 performs the operations to determine the calibration data for calibration. In one embodiment, the shared processor performs operations in the blocks 430-480 to generate a calibration data. In one embodiment, the calibration unit 280 uses referenced object information 681, 682 and 683 and corresponding azimuth and elevation angle information to calibrate the samples 740A, 740B, 750A, and 750B. In one embodiment, the calibration unit 280 is activated when at least one of the object 781, 782, and 783 are detected/reported by the Optical sensor/direction reference unit that may be part of the optical object detection unit 290.

While various embodiments of the present disclosure have been described above, it should be understood that they have been presented by way of example only, and not limitation. Thus, the breadth and scope of the present disclosure should not be limited by any of the above-discussed embodiments, but should be defined only in accordance with the following claims and their equivalents.

What is claimed is:

1. An object detection system comprising:
 a first object detection unit configured to detect a first object from a first radio frequency (RF) signal data comprising a first set of characteristics comprising a first amplitude pattern and a first phase pattern representing the first object, wherein the first object detection unit comprising a first radar signature generator generating a radar RF signal, a first set of processing units transforming the radar RF signal to a second RF signal, a first antenna array transmitting the second RF signal over the first region, a second antenna array receiving a reflected RF signal that is a reflection of the second RF signal from the first object present in the first region, and a second set of processing units transforming the reflected RF signal to the first RF signal, wherein, a first error is introduced into the first RF signal by at least one of the first set of processing units and the second set of processing units and the calibration data is proportional to the first error;

a memory unit with a reference data comprising a second amplitude pattern and a second phase pattern representing the reference object;

and a calibration unit calibrating the first RF signal data using a first calibration data in that, the calibration unit is configured to compare the first amplitude pattern with the second amplitude pattern to determine the first object is the reference object and configured to generate the first calibration data as the difference of first phase pattern and the second phase pattern.

2. The object detection system of claim 1, further comprising:

a second object detection unit providing a second data from an image sensing device, wherein the second data representing the first object, in that, the first object detection unit and the second object detection unit are aligned to detect the first object in a first region and the first set of processing units comprise the first antenna array, a first RF front end circuitry and a first beam steering unit, and the second set of processing units comprise the second set of antenna array, a second RF front end circuitry, wherein, the calibration unit is further configured to compare the first amplitude pattern with the second amplitude pattern when the second data representing the first object corresponds to the reference object.

3. A method of calibrating a phase delay introduced by a transmitter and a receiver of a multiple-input and multiple-output (MIMO) radar object detection system operative to detect a first object in a region of interest comprising:

storing a reference object data comprising a reference amplitude pattern and a reference phase pattern;

receiving a first radio frequency (RF) signal data comprising a first phase pattern and a first amplitude pattern in a first range bin, wherein the first phase pattern and the first amplitude pattern representing a first object;

receiving a second data from a image sensing device focused to the region of interest, wherein the second data comprising a second characteristic;

determining if the first object is a reference object from the first amplitude pattern and the reference amplitude pattern;

fetching a reference phase pattern when the first object is determined to be same as the reference object;

forming a calibration data as difference of the first phase pattern and the reference phase pattern; and calibrating the first radio frequency (RF) signal data with the calibration data.

4. The method of claim 3, further comprising:

correlating the first amplitude pattern and the reference amplitude pattern; and determine the first object is same as the reference object when the correlation result is above a threshold value, applying correlation value to a plurality of range bins in the first RF signal, wherein the first range bin is one of the plurality of range bins.

5. The object detection system of claim 2, wherein the first RF signal data comprising a first range bin and a second range bin, in that, the first amplitude pattern and the first phase pattern are in the first range bin, the calibration unit applying the calibration data to both first and second range bin.

6. The object detection system of claim 5, wherein the second antenna array comprising N number of antenna elements, correspondingly providing N data elements to each of the first range bin and the second range bin, and the second phase pattern comprising N phase values corresponding to the N number of antenna elements.

7. The object detection system of claim 6, wherein the first object detection unit is configured to operate when the first RF signal is a frequency modulated continuous wave radar (FMCW) signal.

8. The method of claim 4, further comprising performing said correlating first amplitude pattern and the reference amplitude pattern when the second characteristic representing the first object.

* * * * *